Aug. 26, 1969 A. R. KAYE ET AL 3,463,940

D.C. RESTORATION CIRCUIT

Filed Feb. 2, 1966 2 Sheets-Sheet 2

United States Patent Office 3,463,940

Patented Aug. 26, 1969

3,463,940

D.C. RESTORATION CIRCUIT

Alan R. Kaye and Gordon C. Field, Ottawa, Ontario, Canada, assignors to Northern Electric Company Limited, Montreal, Quebec, Canada Filed Feb. 2, 1966, Ser. No. 524,381
Int. Cl. H03k 5/08
U.S. Cl. 307—264 6 Claims

ABSTRACT OF THE DISCLOSURE

A D.C. restoration circuit, especially for composite video signals, provides an auxiliary D.C. restorer for generating a compensation signal that is used in the main D.C. restorer to compensate for differences in amplitude between sync pulses of white and black video signals that would otherwise occur after D.C. restoration.

This invention relates to an improved D.C. restoration circuit for restoring the D.C. component of a waveform which includes periodic pulses. The invention is particularly applicable in the television art, where D.C. restoration circuits are commonly employed to restore the sync tips or blanking level in a composite video signal to a fixed D.C. reference level, for example prior to clipping some part of the video signal.

Figure 1:
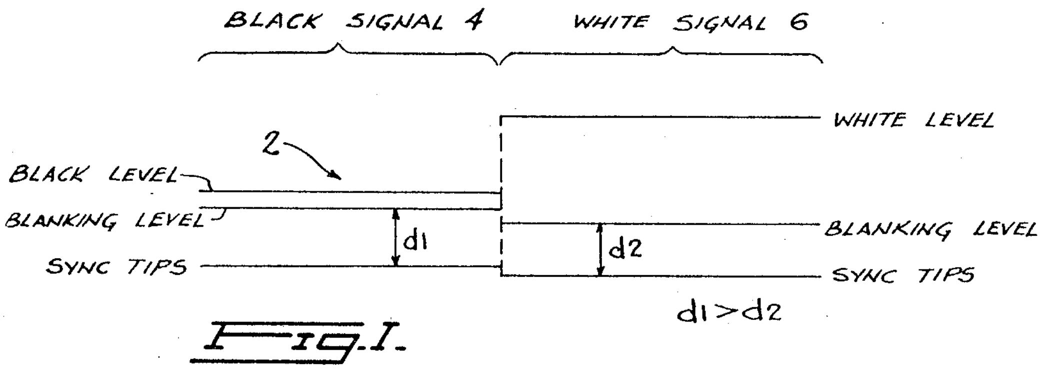
Figure 2:
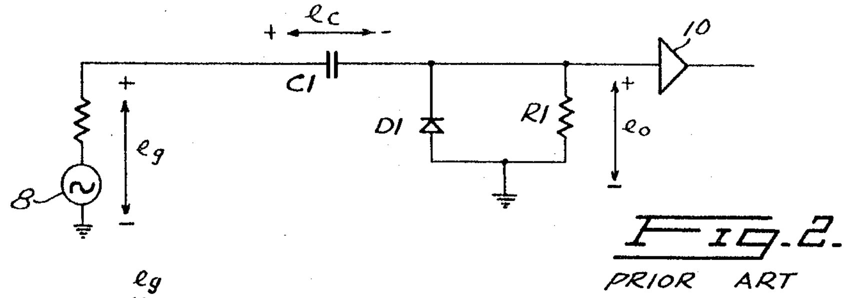
Figures 3A, 3B, 3C:
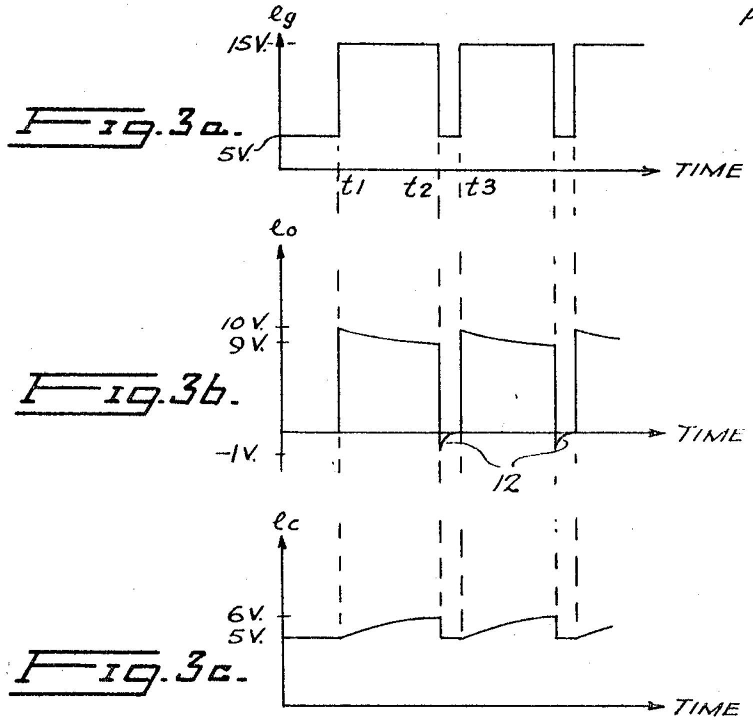
Figure 4:
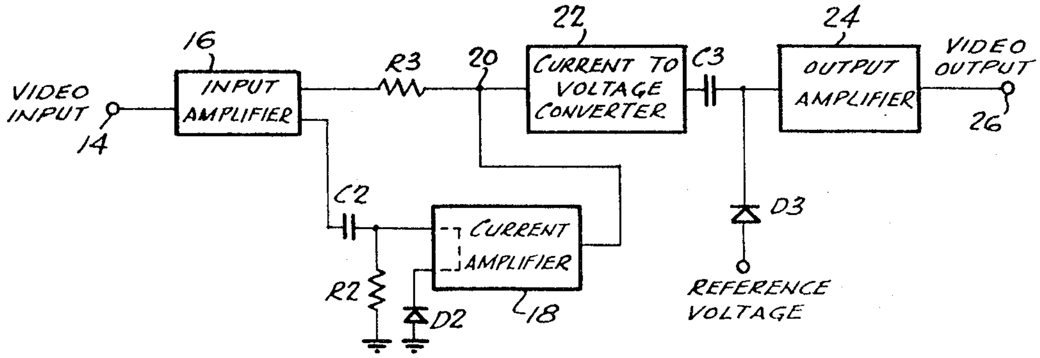
Figure 5:
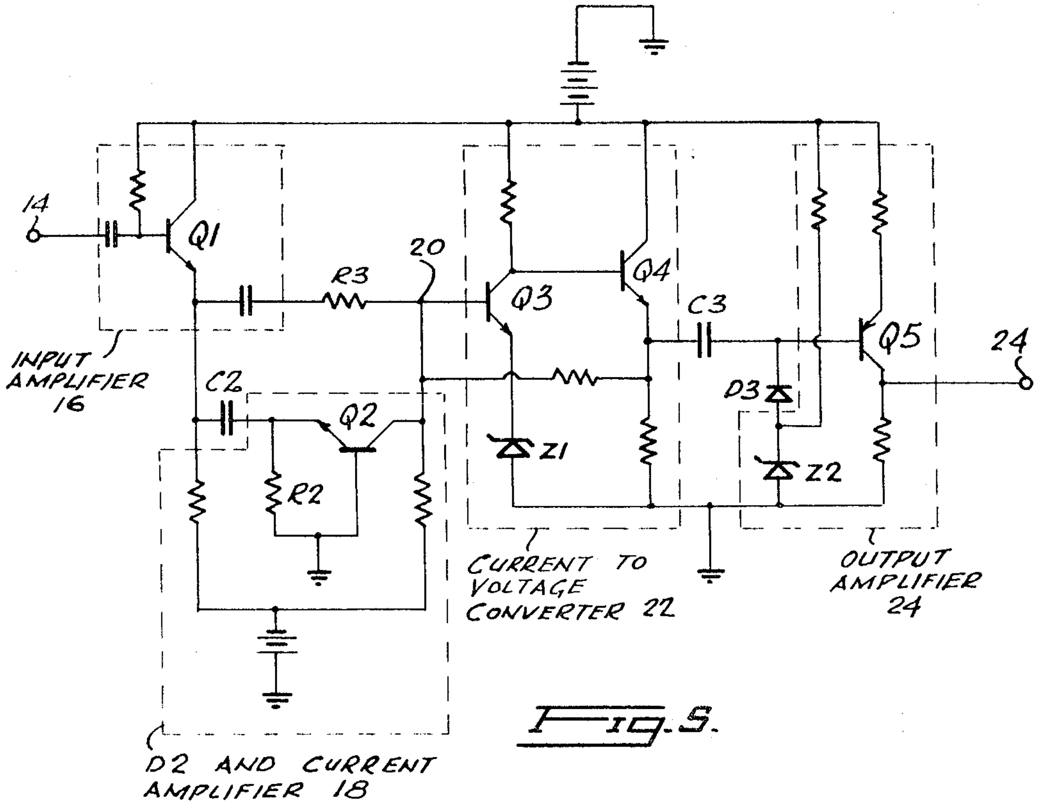

The invention both in its general aspects and its specific form, will best be understood after a preliminary discussion of the accompanying drawings in which, FIGURE 1 shows typical waveforms for a composite video signal after D.C. restoration;

FIGURE 2 shows a common prior art D.C. restorer circuit;

FIGURES 3A, 3B, and 3C show waveforms for the circuit of FIGURE 2;

FIGURE 4 shows in block diagram form an embodiment of the present invention, and FIGURE 5 shows a more detailed circuit for the arrangement of FIGURE 4.

In television systems, the composite video signal (the term composite indicating that the signal includes synchonizing information) is commonly transmitted through coupling capacitors, so that its D.C. component is lost. At points in the system where modification of the signal is required (e.g. where it is desired to clip off part of the signal it is usually necessary to reinsert the D.C. component prior to operation on the signal. When a common capacitor-diode-resistor D.C. restorer circuit is used to reinsert the D.C. component of the signal, it has the effect that the height of the sync pulses after restoration will be slightly less for a white signal than for a black signal. This characteristic is often referred to as dynamic gain.

This effect is shown in FIGURE 1, where a typical composite video signal 2 is shown, having a black portion 4 and a white portion 6. During the black portion 4 of the signal, the voltage difference between the blanking level and the sync tips is shown as dimension $d1$, and during the white portion 6 of the signal, the voltage difference between the blanking level and the sync tips is shown as dimension $d2$. It will be noticed that dimension $d1$ is greater than dimension $d2$, and also that the sync tips during the white portions 6 of the signal are slightly more negative than those during the black portion 4 of the signal.

The reasons for these effects are as follows. Consider FIGURE 2, where there is shown a typical prior art clamping or D.C. restoration circuit. An input voltage $e_g$ (which may or may not be a video signal) is supplied by a generator 8 to one side of a storage capacitance C1, the other side of which is connected, through parallel combination of a clamping diode D1 and an output resistor R1, to a reference voltage here shown as ground. An output voltage is taken across resistor R1 and fed into a high impedance following circuit such as amplifier 10.

Assume for purposes of illustration that generator 8 is producing an input voltage $e_g$ of the type shown in FIGURE 3A. Assume that at all material times prior to time $t1$, voltage $e_g$ is a steady +5 volts, so that capacitor C1 is charged to a potential of +5 volts. Assume that at time $t1$, voltage $e_g$ suddenly increases to +15 volts. The charge on capacitor C1 cannot change instantaneously, and therefore the increase of +10 volts appears across resistor R1 (diode D1 being reverse biased at this time) so that an output voltage $e_o$ of 10 volts appears (FIGURE 3B). Capacitor C1 now charges through resistor R1, as shown in FIGURE 3C, and output voltage $e_o$ begins to drop. At time $t2$, input voltage $e_g$ drops back to +5 volts. Assume that by this time capacitor C1 (which is charging from +5 volts toward +15 volts) has charged to +6 volts, in which case the output voltage $e_o$ will have dropped from +10 volts to +9 volts.

Since input voltage $e_g$ has now dropped to +5 volts, and since the charge on capacitor C1 is +6 volts, the difference of −1 volt appears across resistor R1, forward biasing diode D1, which conducts and rapidly discharges capacitor C1 back to +5 volts. This may be termed the clamping interval. A slight negative spike 12 appears in the output voltage at this time, since the voltage drop across diode D1 is not zero but depends upon the current passing through the diode. At time $t3$, the input voltage rises to +15 volts again, and the process just discussed repeats. In the result, during the more positive part of the waveform, capacitor C1 slowly discharges through resistor R1, and during the more negative part of the waveform, diode D1 conducts to provide a low impedance path for rapid restoration of the charge on capacitor C1.

It will be evident that the larger the difference between the positive and negative extremes of voltage $e_g$, the more rapidly will the charge on capacitor C1 change between clamping intervals, and thus diode D1 will have to conduct more heavily for a large input signal than for a small input signal, in order to recharge capacitor C1. The more heavily diode D1 conducts, the greater is the voltage drop thereacross.

Since a white video signal is of larger amplitude than a black video signal, diode D1 will conduct more heavily when restoring a white signal than a black signal and hence, due to the greater voltage drop across the diode, the tips of the sync pulses will be slightly more negative on a white signal than on a black signal as shown in FIGURE 1. In addition, with a white signal, more of each sync pulse is lost, due to the greater discharge of the capacitor during picture information periods followed by clipping by the diode of that part of the sync pulse that would otherwise appear below the clamping voltage. Thus, the average amplitude of sync pulses will be slightly less for a white signal than for a black signal, after D.C. restoration in a circuit of the type shown in FIGURE 1.

The object of the present invention is to provide a circuit that will reduce the above discussed difference in amplitude occurring between sync pulses of white and black video signals after D.C. restoration. The invention is of course also applicable to other types of signals containing periodic pulses. The invention provides no improvement for the problem that the sync tip level is slightly more negative in restored white signals than in restored black signals.

A block diagram illustrating an embodiment of the present invention is shown in FIGURE 4, where the input signal is applied through an input terminal 14 to an input amplifier 16. Amplifier 16 has a low output impedance, to drive an auxiliary D.C. restorer now to be described.

From the input amplifier 16, a sample of the composite video signal is taken off and passed through an auxiliary D.C. restorer comprising a storage capacitor C2, leakage resistor R2, and clamping diode D2. When the auxiliary D.C. restorer operates, diode D2 will conduct during sync pulses, and the current pulses through diode D2 will represent the charge being added to capacitor C2 to make up for the charge leaking off capacitor C2 between sync pulses. These current pulses are isolated by a current amplifier 18, and the current pulses at the output of amplifier 18 are added at node 20 to the main video input signal, which has been converted from a voltage signal to a current signal by flow through a resistor R3. The combined currents are then converted back to a voltage signal by a current to voltage converter 22, and the resultant voltage signal is D.C. restored in a conventional manner by a further D.C. restorer comprising capacitor C3, diode D3, and output amplifier 24. The input impedance of amplifier 24 provides the leakage resistance for the further D.C. restorer just described.

In the result, the auxiliary D.C. restorer acts to increase the height of the sync pulses, before restoration in the main D.C. restorer, by the amount that will normally be removed by the main D.C. restorer. Thus, at the output terminal 26 of the output amplifier 24, the sync pulses will have a substantially constant height, regardless of the average picture level of the input signal. The gain of the current amplifier 18 may, if desired, be made adjustable over a small range to compensate for any difference between diodes D2 and D3.

A more detailed embodiment of the device illustrated in block form in FIGURE 4 is shown in FIGURE 5. Transistor Q1, in a conventional emitter-follower configuration, forms the input amplifier 16. Transistor Q2 is connected as a grounded base emplifier and combines the functions of diode D2 and current amplifier 18, the base-emitter junction of transistor Q2 acting as diode D2. Transistor Q2 conducts during sync pulses (thus acting somewhat like a conventional sync separator) and the output current pulses at its collector are very nearly equal to the emitter current pulses during sync pulses. The output impedance of a grounded base stage is very high, and thus transistor Q2 in the configuration shown acts as a current generator.

The current at the collector of transistor Q2 is added at node 20 to the current flowing through resistor R3. The combined currents are then converted back to a voltage signal in current to voltage converter 22, which comprises transistors Q3 and Q4, the input impedance at the base of transistor Q3 being very low. Zener diode Z1 provides bias for transistor Q3. An output from the current to voltage converter is taken at the emitter of transistor Q4.

This output is conventionally D.C. restored by capacitor C3 and diode D3, transistor Q5 acting as the output amplifier 24. Zener diode Z2 provides a reference voltage to which the sync tips of the video signal are clamped.

In order to avoid difficulties of adjustment of the circuit, with the possibility of obtaining good compensation only at one point, the capacitors C2 and C3 are preferably the same size; diodes D1 and D2 are preferably of the same material; and resistor R2 preferably approximates in resistance value the input impedance of output amplifier 24.

Although the invention has been described with reference to a television signal, it will be realized, as previously discussed, that the invention is applicable to other signals containing periodic pulses (e.g. timing pulses) which are to be D.C. restored. It will also be realized that devices other than semiconductor devices could be used, e.g. vacuum diodes and tubes could be used.

The term "compensation" as used in this description is not intended to mean perfect compensation, but is intended to describe an improved situation in which there is less variation in strength between the sync pulses of e.g. a black signal and a white signal with the use of the invention than without the use of the invention.

We claim:

1. For an input signal of the type containing periodic pulses, a direct current restorer circuit for restoring said pulses to a substantially common level, said circuit comprising:

(a) input means for said input signal, (b) auxiliary direct current restorer means coupled to said input means for direct current restoring a sample of said input signal, said auxiliary direct current restorer means including a storage capacitance connected to said input means for storing a signal proportional to the amplitude of said input signal, (c) means coupled to said auxiliary direct current restorer means for providing during each said pulse a compensation signal proportional to the amount of charge flowing into said capacitance during such pulse, (d) means for adding said compensation signal to said input signal to form a sum signal in which the amplitude of each said pulse is increased by said compensation signal, and further direct current restorer means coupled to said adding means (d) for direct current restoring said sum signal.

2. A circuit according to claim 1 wherein:

(f) said auxiliary direct current restorer means includes clamping diode means, said clamping diode means conducting during each pulse of said sample signal and thereby clipping a portion of each such pulse of said sample signal, current pulses through said clamping diode means being representative of the portion of each such pulse clipped off by said clamping diode, (g) and said means (c) includes means coupled to said clamping diode means for producing said compensation signal as a signal proportional to said current pulses.

3. A circuit according to claim 1 wherein:

(f) said auxiliary direct current restorer means includes clamping diode means, said clamping diode means conducting during each pulse of said sample signal and thereby clipping a portion of each such pulse of said sample signal, current pulses through said clamping diode means being representative of the portion of each such pulse clipped off by said clamping diode, (g) said means (c) includes means coupled to said clamping diode means for producing said compensation signal as a first current signal proportional to said current pulses, (h) and said means (d) includes (i) means coupled to said input means for converting said input signal to a second current signal, (ii) means for adding said first and second current signals to produce a combined current signal, (iii) and means for converting said combined current signals to a voltage signal to provide said sum signal.

4. A circuit according to claim 3 wherein said auxiliary direct current restorer means includes leakage resistance means, and said further direct current restorer means includes a further storage capacitance, further clamping diode means, and further leakage resistance means, said capacitances being substantially equal in capacitance value, said clamping diode means being similar in characteristics, and said leakage resistance means being substantially equal in resistance value.

5. A circuit according to claim 1 wherein:

(f) said means (b) and (c) together include a transistor in common base configuration, and leakage resistance means connected between the base and emitter of said transistor, said capacitance being connected between said input means and the emitter of said transistor, the base-emitter junction of said transistor acting as clamping diode means, said compensation signal appearing at the collector of said transistor as a first current signal, (g) and said means (d) includes
- (i) resistance means coupled to said input means for converting said input signal to a second current signal,
- (ii) means coupling the collector of said transistor to said resistance means for combining said first and second current signals,
- (iii) and converter means for receiving the combined first and second current signals and converting the same to a voltage signal to drive said further direct current restorer means.

6. A circuit according to claim 5 wherein said further direct current restorer means includes a further storage capacitance, further clamping diode means, and further leakage resistance means, said capacitances being substantially equal in capacitance value, said clamping diode means having similar characteristics, and said leakage resistances means being substantially equal in resistance value.

References Cited

UNITED STATES PATENTS

| | | |
|---|---|---|
| 2,539,774 | 1/1951 | Gluyas. |
| 3,375,326 | 3/1968 | Baldwin et al. |

JOHN S. HEYMAN, Primary Examiner

DAVID M. CARTER, Assistant Examiner

U.S. Cl. X.R.

178—7.1, 7.3; 307—237; 330—11